(12) United States Patent
Sato et al.

(10) Patent No.: US 10,347,895 B2
(45) Date of Patent: Jul. 9, 2019

(54) CONDUCTIVE MEMBER MODULE AND BATTERY PACK

(71) Applicant: Yazaki Corporation, Tokyo (JP)

(72) Inventors: Katsunori Sato, Shizuoka (JP); Yutaro Okazaki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/918,096

(22) Filed: Mar. 12, 2018

(65) Prior Publication Data

US 2018/0198105 A1 Jul. 12, 2018

Related U.S. Application Data

(63) Continuation of application No. PCT/JP2016/081145, filed on Oct. 20, 2016.

(30) Foreign Application Priority Data

Oct. 20, 2015 (JP) .................................. 2015-206681

(51) Int. Cl.
| | |
|---|---|
| *H01M 4/02* | (2006.01) |
| *H01M 2/20* | (2006.01) |
| *H01M 10/48* | (2006.01) |

(52) U.S. Cl.
CPC ......... *H01M 2/206* (2013.01); *H01M 10/482* (2013.01); *H01M 2220/20* (2013.01)

(58) Field of Classification Search
CPC ...................................................... H01M 8/04
See application file for complete search history.

(56) References Cited

U.S. PATENT DOCUMENTS

| | | | |
|---|---|---|---|
| 2002/0051906 A1* | 5/2002 | Wakata | ................. G01R 31/364 |
| | | | 429/178 |
| 2014/0363711 A1* | 12/2014 | Zhao | ................... H01M 10/486 |
| | | | 429/90 |

(Continued)

FOREIGN PATENT DOCUMENTS

| | | |
|---|---|---|
| JP | 2007-335113 A | 12/2007 |
| JP | 2010-114025 A | 5/2010 |

(Continued)

OTHER PUBLICATIONS

International Search Report for PCT/JP2016/081145 dated Jan. 24, 2017 [PCT/ISA/210].

*Primary Examiner* — Jacob B Marks
(74) *Attorney, Agent, or Firm* — Sughrue Mion, PLLC

(57) ABSTRACT

A conductive member module includes a flat cable that includes a plurality of conductors and an insulating coating covering the conductors, a distal end part of each of the conductors being exposed from the coating, and a plurality of conductive members each of which includes a plate-shaped main body and a conductor holding part, the main body being connected to a portion of each of the conductors exposed from the coating by welding, the conductor holding part being separated from the main body at other sides except for one side connected to the main body by cutting in the main body and being folded back toward the main body to hold a portion of each conductor closer to a base end side than a part welded to the main body, the conductive members being continuously arranged along an extending direction of the flat cable.

4 Claims, 9 Drawing Sheets

(56) References Cited

U.S. PATENT DOCUMENTS

2016/0197330 A1 7/2016 Takase et al.
2016/0268576 A1 9/2016 Ichikawa et al.

FOREIGN PATENT DOCUMENTS

| JP | 2010-225449 A | 10/2010 |
| JP | 2011-210711 A | 10/2011 |
| JP | 2014-127229 A | 7/2014 |
| WO | 2015/099062 A1 | 7/2015 |

* cited by examiner

CONDUCTIVE MEMBER MODULE AND BATTERY PACK

CROSS-REFERENCE TO RELATED APPLICATION(S)

This application is a continuation application of International Application PCT/JP2016/081145, filed on Oct. 20, 2016, and designating the U.S., the entire contents of which are incorporated herein by reference.

BACKGROUND OF THE INVENTION

1. Field of the Invention

The present invention relates to a conductive member module and a battery pack.

2. Description of the Related Art

Conventionally, there is known a technique of connecting a flat cable with a conductive member such as a busbar by welding. For example, Japanese Patent Application Laid-open No. 2011-210711 discloses a technique of placing a flexible flat cable on a busbar column and connecting an exposed conductor of the flexible flat cable with each busbar by welding.

Due to expansion and contraction of the flat cable caused by a temperature change, an external force is applied to a welded part between the conductor and the conductive member. It is desired to increase durability of a connection part between the conductive member and the conductor so that a connected state between the conductive member and the conductor of the flat cable is maintained even when such external force is applied.

SUMMARY OF THE INVENTION

An object of the present invention is to provide a conductive member module and a battery pack that can improve durability of the connection part between a conductive member and a conductor of a flat cable.

In order to achieve the above mentioned object, a conductive member module according to one aspect of the present invention includes a flat cable that includes a plurality of conductors and an insulating coating covering the conductors, a distal end part of each of the conductors being exposed from the coating, and a plurality of conductive members each of which includes a plate-shaped main body and a conductor holding part, the main body being connected to a portion of each of the conductors exposed from the coating by welding, the conductor holding part being separated from the main body at other sides except for one side connected to the main body by cutting in the main body and being folded back toward the main body to hold a portion of the conductor closer to a base end side than a part welded to the main body, the conductive members being continuously arranged along an extending direction of the flat cable.

According to another aspect of the present invention, in the conductive member module, the conductor holding part may be wound around the conductor to hold the conductor.

According to still another aspect of the present invention, in the conductive member module, the conductor holding part may include a first holding part and a second holding part, and a distal end of the first holding part and a distal end of the second holding part may sandwich the conductor, and hold the conductor among the first holding part, the second holding part, and the main body.

A battery pack according to still another aspect of the present invention includes a battery module that includes a plurality of battery cells, a flat cable that includes a plurality of conductors and an insulating coating covering the conductors, a distal end part of each of the conductors being exposed from the coating, and a plurality of conductive members each of which includes a plate-shaped main body and a conductor holding part, the main body being connected to a portion of each of the conductors exposed from the coating by welding, the conductor holding part being separated from the main body at other sides except for one side connected to the main body by cutting in the main body and being folded back toward the main body to hold a portion of the conductor closer to a base end side than a part welded to the main body, the conductive members being continuously arranged along an extending direction of the flat cable.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENTS

The following describes a conductive member module and a battery pack according to embodiments of the present invention in detail with reference to the drawings. The present invention is not limited to the embodiments. Components in the following embodiments include a component that is easily conceivable by those skilled in the art or substantially the same component.

First Embodiment

Figure 1:
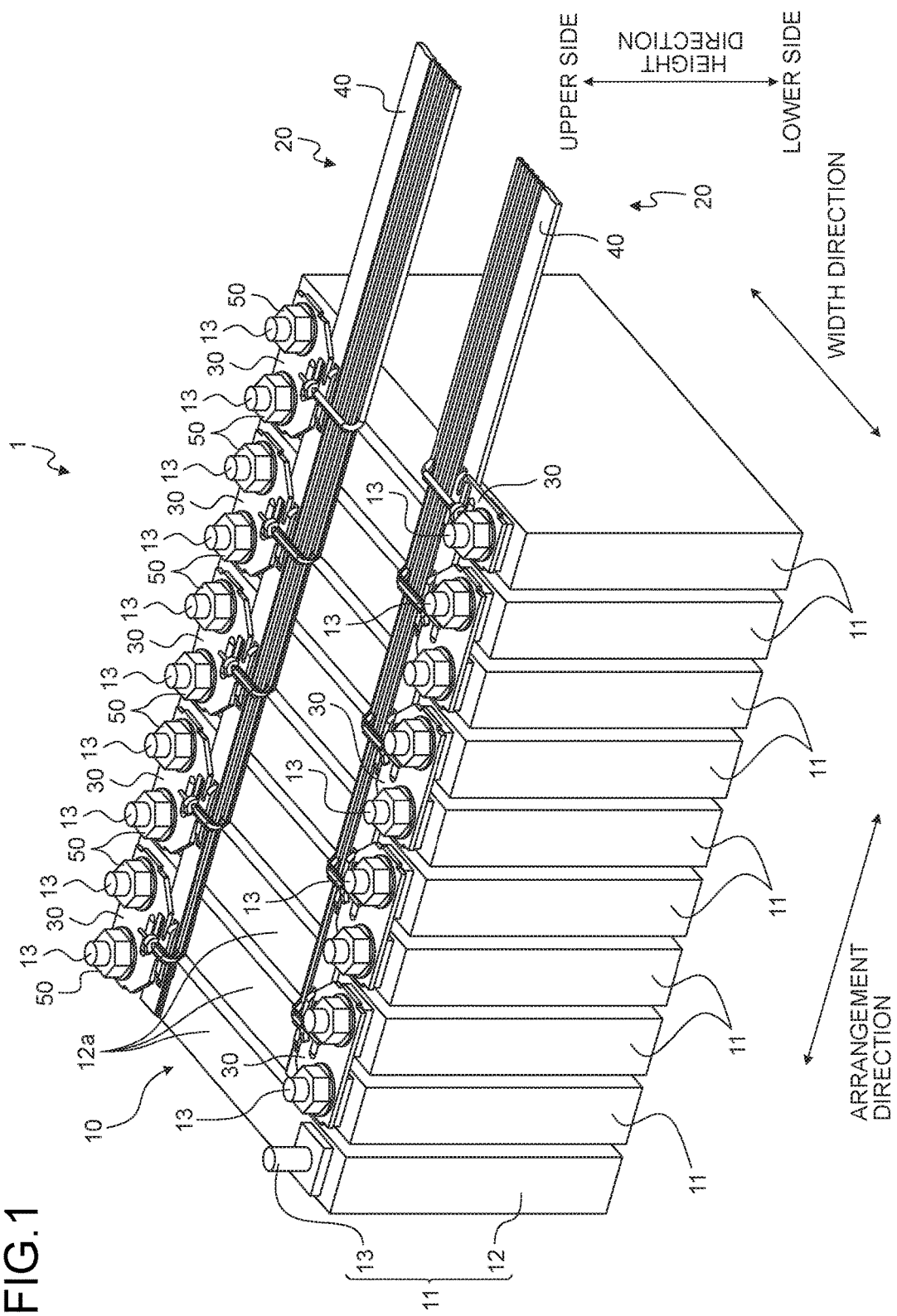
FIG. 1 is a perspective view of a battery pack according to a first embodiment.
Figure 2:
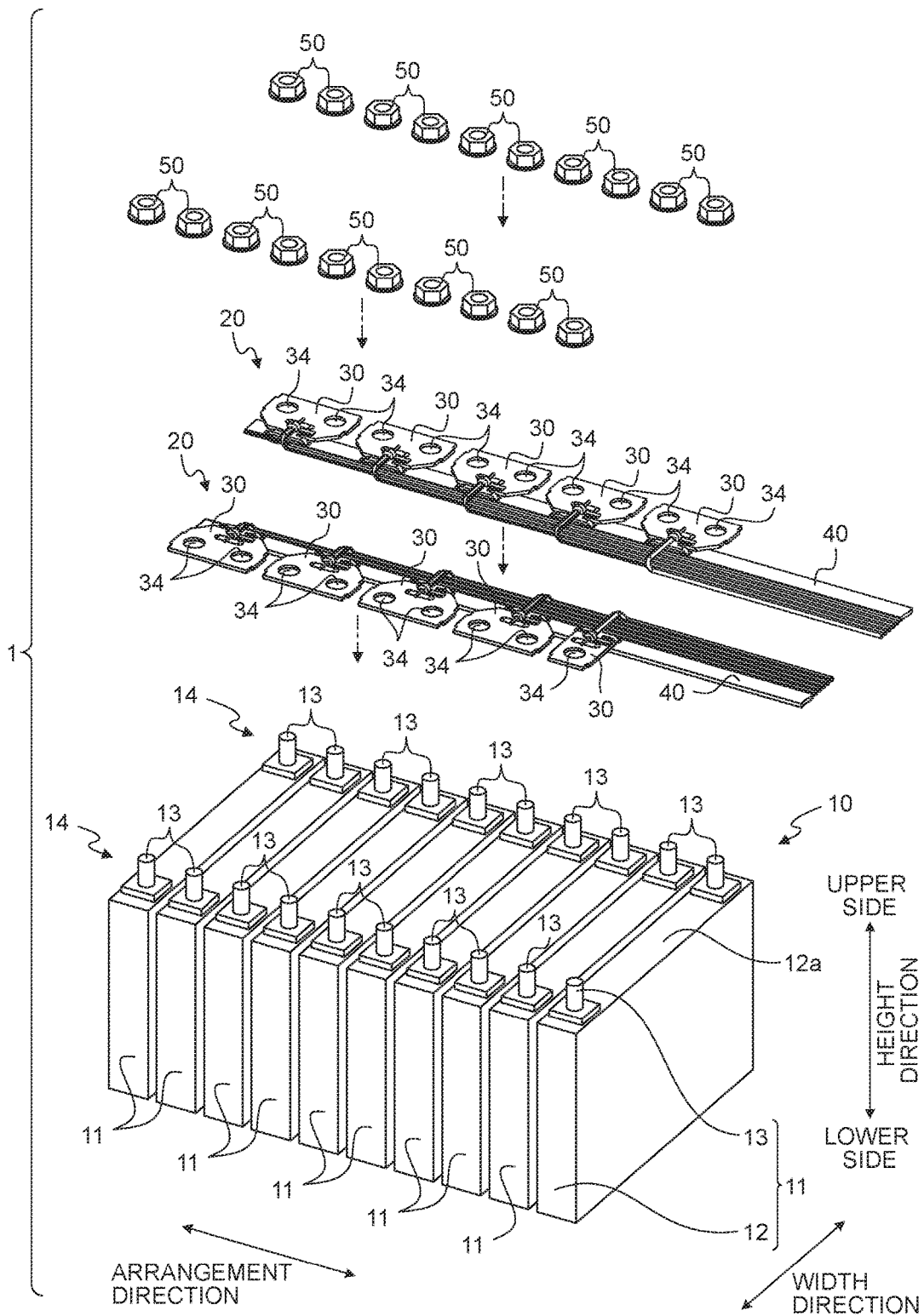
FIG. 2 is an exploded perspective view of the battery pack according to the first embodiment.
Figure 3:
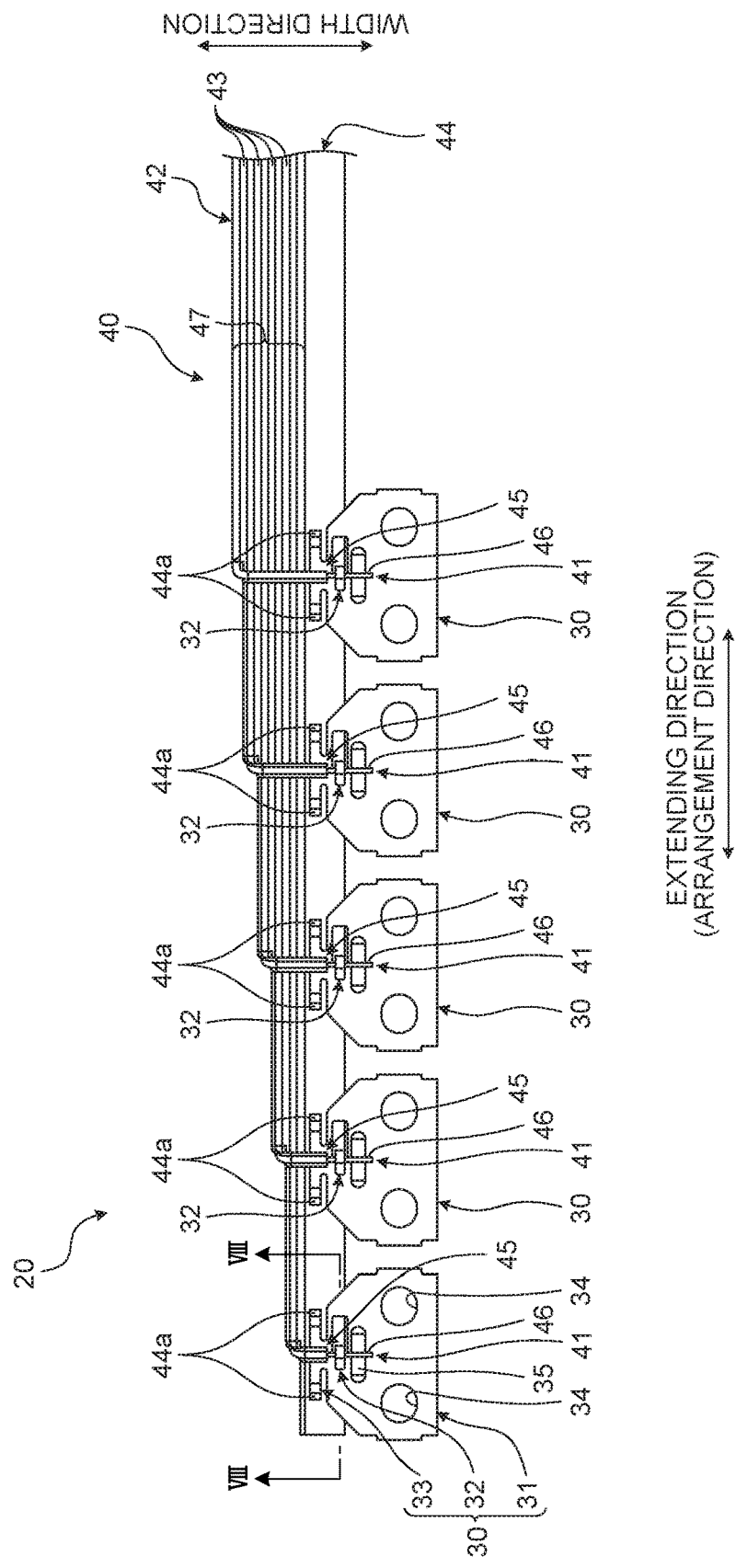
FIG. 3 is a plan view of a conductive member module according to the first embodiment.
Figure 4:
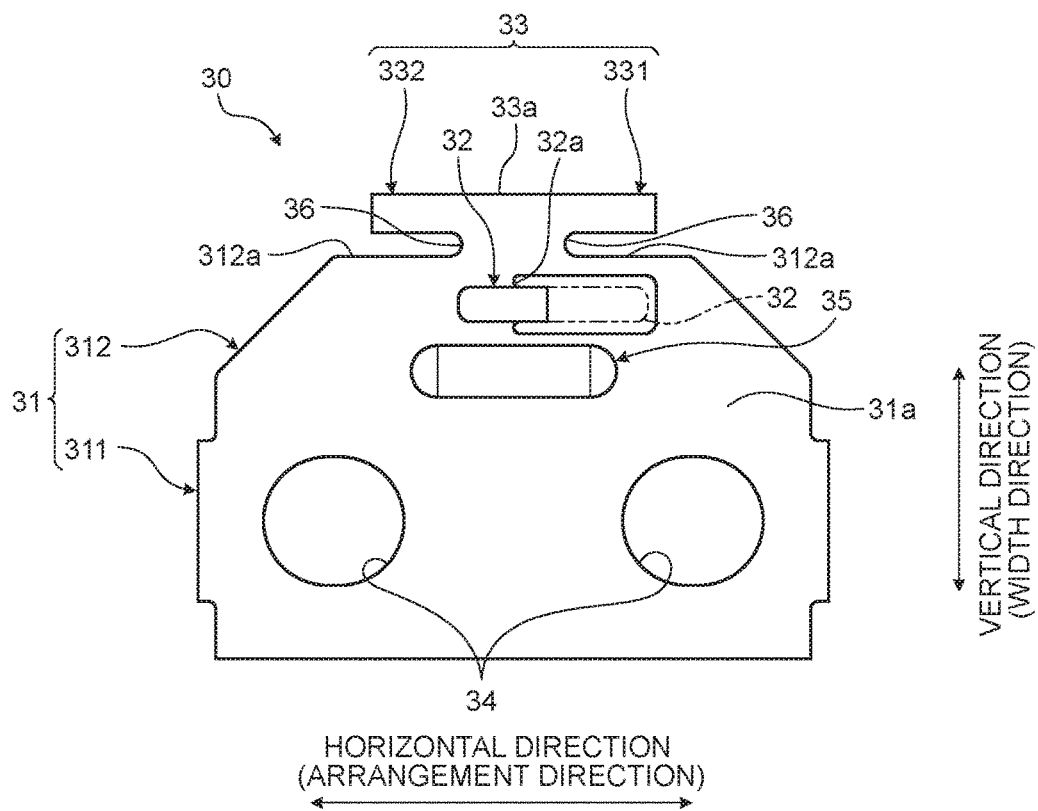
FIG. 4 is a plan view of a busbar according to the first embodiment.
Figure 5:
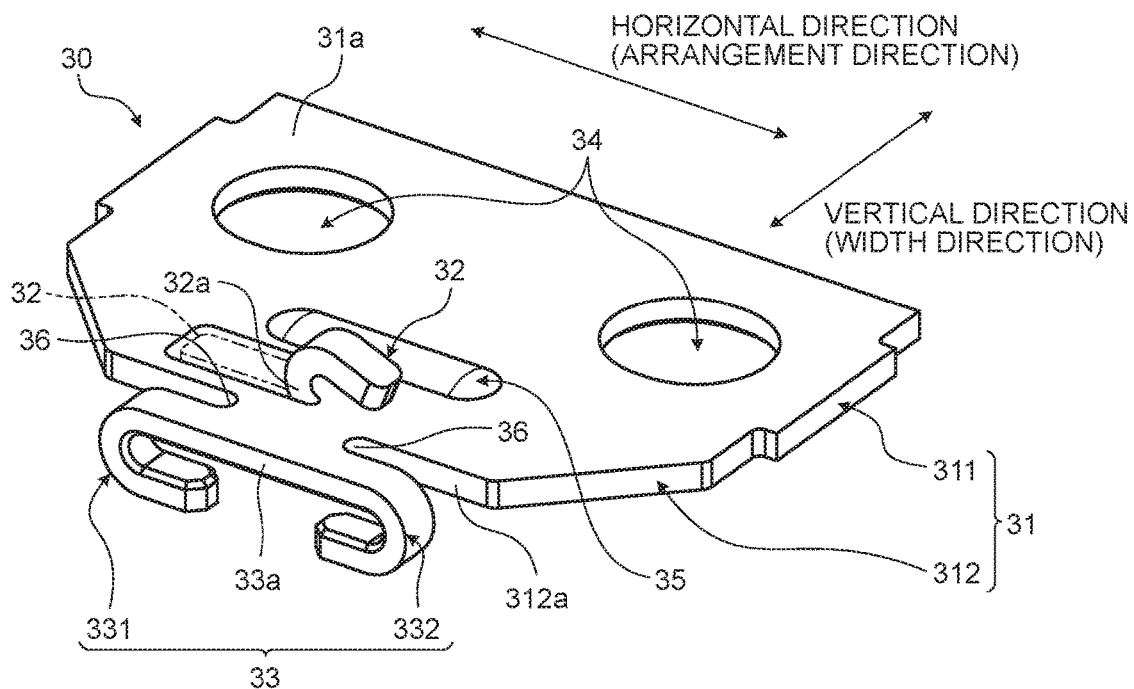
FIG. 5 is a perspective view of the busbar according to the first embodiment.
Figure 6:
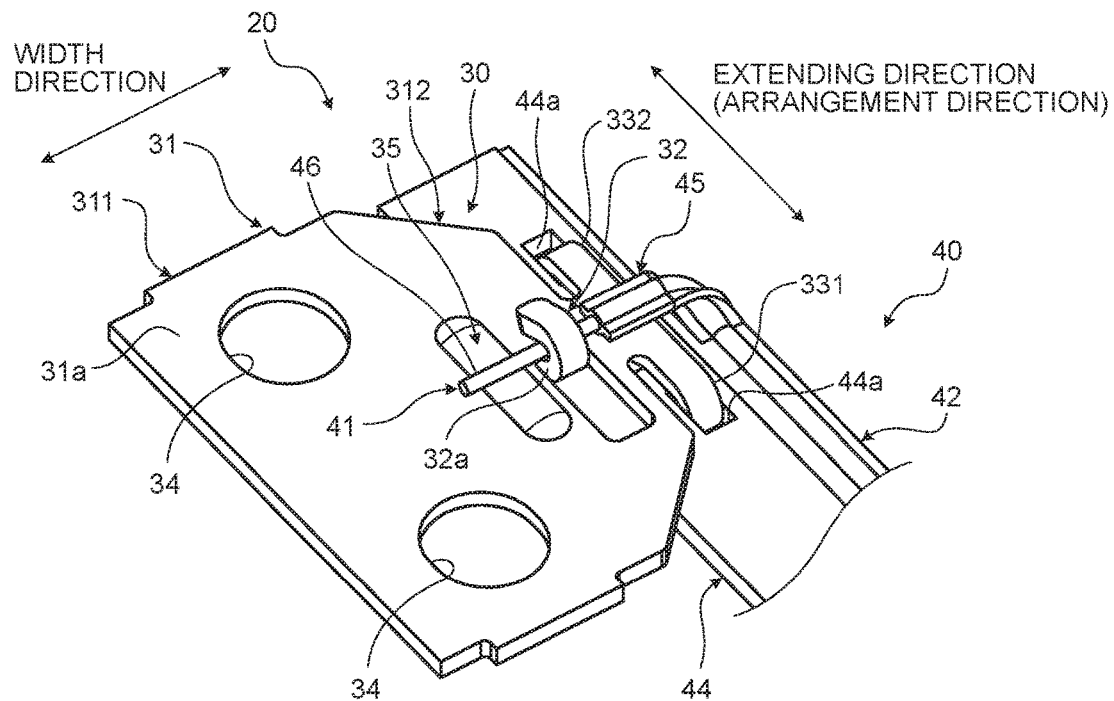
FIG. 6 is a perspective view illustrating a coupling state between the busbar and a flat cable according to the first embodiment.
Figure 7:
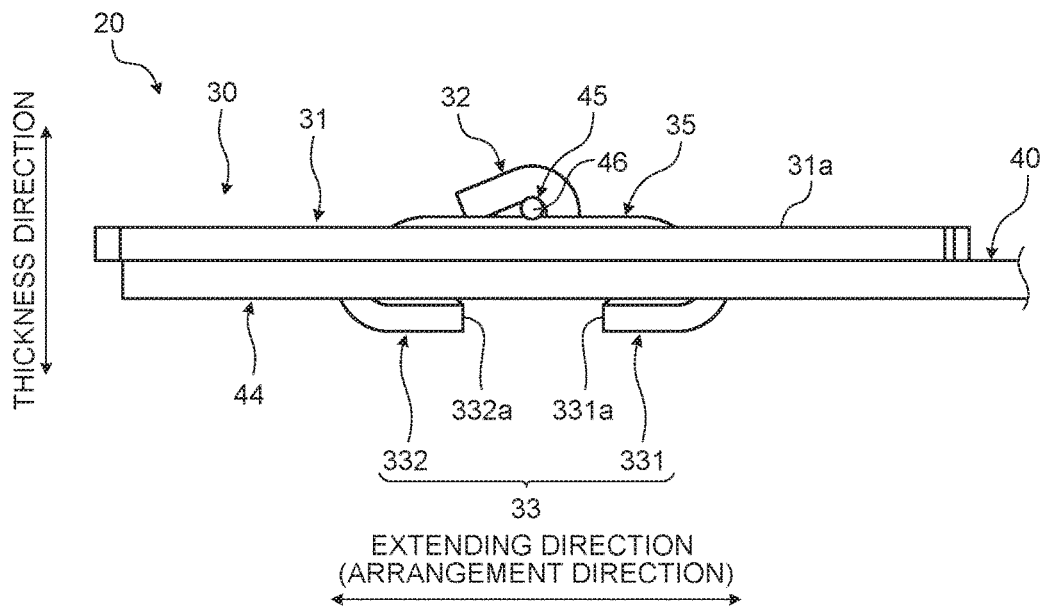
FIG. 7 is a front view illustrating the coupling state between the busbar and the flat cable according to the first embodiment.
Figure 8:
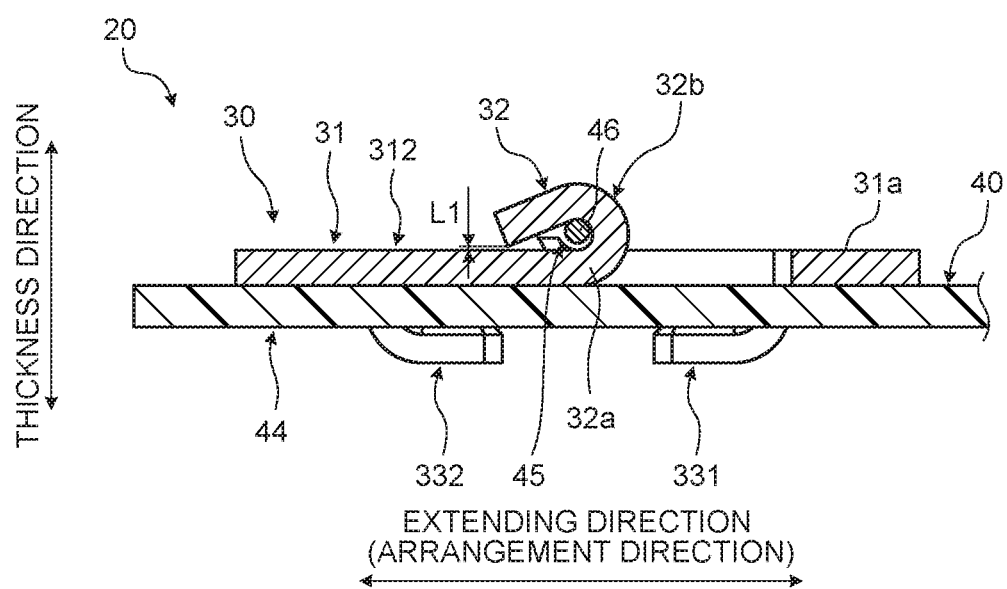
FIG. 8 is a cross-sectional view illustrating the coupling state between the busbar and the flat cable according to the first embodiment.

The following describes a first embodiment with reference to FIGS. 1 to 8. The first embodiment relates to a conductive member module and a battery pack. FIG. 1 is a perspective view of a battery pack according to the first embodiment of the present invention, FIG. 2 is an exploded perspective view of the battery pack according to the first embodiment, FIG. 3 is a plan view of a conductive member module according to the first embodiment, FIG. 4 is a plan view of a busbar according to the first embodiment, FIG. 5 is a perspective view of the busbar according to the first embodiment, FIG. 6 is a perspective view illustrating a coupling state between the busbar and a flat cable according to the first embodiment, FIG. 7 is a front view illustrating the coupling state between the busbar and the flat cable according to the first embodiment, and FIG. 8 is a cross-sectional view illustrating the coupling state between the busbar and the flat cable according to the first embodiment.

As illustrated in FIGS. 1 and 2, a battery pack 1 according to the first embodiment includes a battery module 10 and a conductive member module 20. The battery pack 1 is mounted on a vehicle such as an electric vehicle and a hybrid vehicle. The battery module 10 is an aggregate of a plurality of battery cells 11. The conductive member module 20 is an aggregate of a plurality of busbars 30 and a flat cable 40. The conductive member module 20 electrically connects the plurality of battery cells 11 in series or in parallel. The battery module 10 includes a housing (not illustrated) including an accommodation chamber for each battery cell 11. Each battery cell 11 is accommodated in the accommodation chamber of the housing.

The battery cell 11 includes a cell main body 12 and a pair of electrode terminals 13. The cell main body 12 has a rectangular shape. In the first embodiment, the cell main body 12 has a rectangular parallelepiped shape. The electrode terminals 13 are arranged on one face of the cell main body 12. The battery module 10 is mounted such that a face 12*a* of the cell main body 12 on which the electrode terminals 13 are arranged faces an upper side of the vehicle. In the following description, a face of the cell main body 12 on which the electrode terminals 13 are arranged is referred to as an "upper face 12*a*". A long side direction of the upper face 12*a* is referred to as a "width direction". The electrode terminals 13 are each a stud bolt projecting from the upper face 12*a*, and are arranged on both ends in the width direction of the upper face 12*a*. One of the pair of electrode terminals 13 is a positive electrode terminal, and the other one is a negative electrode terminal.

In the battery module 10, the battery cells 11 are arranged at predetermined intervals along a direction orthogonal to the width direction. In the following description, a direction where the battery cells 11 are arranged is referred to as an "arrangement direction". When the battery cells 11 are arranged along the arrangement direction, the electrode terminals 13 on one side of the battery cells 11 are arranged in a line along the arrangement direction, and the electrode terminals 13 on the other side of the battery cells 11 are arranged in a line along the arrangement direction. The arranged battery cells 11 virtually form a rectangular shape. Electrode terminal groups 14 each including the plurality of electrode terminals 13 are formed on one side and the other side in the width direction of the rectangular shape. In each electrode terminal group 14, the positive and the negative electrode terminals 13 may be alternately arranged, or the electrode terminals 13 of the same polarity may be continuously arranged. In the battery module 10 according to the first embodiment, the electrode terminal group 14 is configured by the electrode terminals 13 of the same polarity.

The conductive member module 20 is an aggregate including the flat cable 40 and the busbars 30. One conductive member module 20 is arranged for one electrode terminal group 14. Thus, two conductive member modules 20 are arranged for one battery module 10. To electrically connect the busbar 30 with the electrode terminal 13, welding, screwing, and the like are used. In the first embodiment, when a nut 50 is fastened onto the electrode terminal 13, the busbar 30 is physically and electrically connected to the electrode terminal 13. More specifically, the electrode terminal 13 of the electrode terminal group 14 is inserted one by one into each insertion hole 34 in the busbars 30 of the conductive member module 20. When the nut 50 is fastened onto the electrode terminal 13, the busbar 30 is fastened to the battery cell 11, and is electrically connected to the electrode terminal 13.

As illustrated in FIG. 3, the flat cable 40 includes a plurality of conductors 41 and an insulating coating 42 that covers the conductors 41. The conductor 41 is formed by a conductive material such as metal (for example, copper). The coating 42 is formed in a belt shape with an insulating synthetic resin and the like. In the coating 42, the conductors 41 having a linear shape are arranged in parallel at intervals. A connector is connected to one end of the flat cable 40. Each conductor 41 electrically connects the connector with each busbar 30.

In the coating 42, a groove 43 is arranged between adjacent conductors 41 along an extending direction of the flat cable 40. A held part 44 is provided at an end of the coating 42 in the width direction. The held part 44 is a belt-shaped constituent part not including the conductor 41 therein. That is, the flat cable 40 includes a main body 47 and the held part 44 arranged on one side in the width direction of the main body 47. The main body 47 is configured by the conductors 41 and the belt-shaped coating 42 including the conductors 41 therein. The held part 44 is a portion that is held by the busbar 30 and coupled to the busbar 30, and functions as a rib for securing rigidity of the flat cable 40. A plurality of through-holes 44*a* is arranged in the held part 44 along the extending direction of the flat cable 40. Two through-holes 44*a* are arranged for each busbar 30. The busbars 30 are arranged along the held part 44.

The flat cable 40 is cut along the groove 43 to be separated into individual cable parts 45. The cable part 45 is configured by the conductor 41 and a portion of the coating 42 that covers the conductor 41. One end side (a side opposite to the connector) of the flat cable 40 is cut into a plurality of cable parts 45 having different lengths. At a distal end portion of each cable part 45, the conductor 41 is exposed from the coating 42. In the following description, in the cable part 45, the conductor 41 exposed from the coating 42 is referred to as an "exposed part 46". The cable parts 45 are bent in a direction orthogonal to the extending direction of the flat cable 40. The bent cable parts 45 are arranged at predetermined intervals along the extending direction of the flat cable 40. In each bent cable part 45, the exposed part 46 projects from the held part 44 in the width direction. Each cable part 45 is connected to the busbar 30. By being connected to the cable parts 45, the busbars 30 are continuously arranged at predetermined intervals along the extending direction of the flat cable 40.

The busbar 30 is a conductive member made of a conductive material, and includes a busbar main body 31, a conductor holding part 32, and a cable holding part 33 as illustrated in FIGS. 4 and 5. The busbar main body 31, the conductor holding part 32, and the cable holding part 33 are integrally formed with each other. The busbar 30 according to the first embodiment is formed, for example, by punching a metal plate. FIGS. 4 and 5 illustrate, by a solid line, the conductor holding part 32 and the cable holding part 33 on which folding processing (crimping) is performed. The conductor holding part 32 before folding processing is performed is illustrated in FIGS. 4 and 5 by a chain double-dashed line.

The busbar main body 31 is a main body of the busbar 30. The busbar main body 31 has a flat plate shape, and includes a first constituent part 311 and a second constituent part 312. The first constituent part 311 is a constituent part having a rectangular plane shape. The second constituent part 312 is a constituent part having a substantially trapezoidal plane shape, and is connected to one end in a vertical direction of the first constituent part 311. A "vertical direction" of the busbar 30 corresponds to the width direction in a state in which the conductive member module 20 is assembled to the battery module 10 (FIG. 1, FIG. 2). A "horizontal direction" of the busbar 30 is a direction orthogonal to the vertical direction, and corresponds to the arrangement direction in a state in which the conductive member module 20 is assembled to the battery module 10. The second constituent part 312 has a tapered shape formed to have a width which narrows as getting away from the first constituent part 311 in the vertical direction.

The first constituent part 311 includes the insertion holes 34 into which the electrode terminals 13 are inserted. The insertion holes 34 are arranged on one end side and the other end side in the horizontal direction of the first constituent part 311. Each insertion hole 34 passes through the first constituent part 311 in a thickness direction, and causes a space on a surface side of the first constituent part 311 to communicate with a space on a back surface side thereof. The busbar main body 31 includes a projection part 35. The projection part 35 is arranged on one face (hereinafter, referred to as a "surface") 31a of the busbar main body 31. The projection part 35 is arranged at a boundary part between the first constituent part 311 and the second constituent part 312. The projection part 35 extends in the horizontal direction. A cross-sectional shape of the projection part 35 is an arc shape at a cross section orthogonal to the horizontal direction.

The conductor holding part 32 is a plate-shaped constituent part formed by cutting processing and the like. A plane shape of the conductor holding part 32 is a rectangle. An end 32a in the horizontal direction of the conductor holding part 32 is connected to the second constituent part 312. In the conductor holding part 32, three sides of the rectangle including two long sides are cut and separated from the second constituent part 312, and the other one side is connected to the second constituent part 312.

The cable holding part 33 is a plate-shaped constituent part formed by cutting processing, notch processing, and the like. The cable holding part 33 includes a first cable holding part 331 projecting toward one side in the horizontal direction, and a second cable holding part 332 projecting toward the other side in the horizontal direction. A base end part 33a of the first cable holding part 331 and the second cable holding part 332 is connected to a distal end 312a of the second constituent part 312. The cable holding parts 331 and 332 are separated from the second constituent part 312 by notch parts 36 extending in the horizontal direction.

As illustrated in FIGS. 6 and 7, the cable holding part 33 holds the held part 44 of the flat cable 40. The first cable holding part 331 and the second cable holding part 332 are inserted into different through-holes 44a to be bent, respectively, and sandwich the held part 44. The cable holding parts 331 and 332 holds the held part 44 in such a manner that distal end parts 331a and 332a thereof are bent inward to be opposed to each other in the horizontal direction. The cable holding part 33 regulates relative movement of the busbar main body 31 with respect to the flat cable 40, and fixes the busbar main body 31 to the flat cable 40.

The exposed part 46 is electrically connected to the projection part 35 by welding, and physically fixed to the projection part 35. The exposed part 46 is, for example, connected to a center part in the horizontal direction of the projection part 35. In the conductive member module 20 according to the first embodiment, part on a distal end side of the exposed part 46 is welded to the projection part 35, and the distal end of the exposed part 46 projects toward the first constituent part 311 across the projection part 35.

The conductor holding part 32 is folded back toward the busbar main body 31, and holds a portion of the conductor 41 closer to the base end side than a part welded to the busbar main body 31. In this case, the base end side of the conductor 41 indicates a side opposite to the distal end side in a direction along an axis of the conductor 41, and typically indicates a connector side. The conductor holding part 32 according to the first embodiment holds the exposed part 46, and is electrically connected to the exposed part 46.

The conductor holding part 32 is folded back at an end 32a serving as a base end part to hold the exposed part 46. As illustrated in FIG. 7, the conductor holding part 32 according to the first embodiment is wound around the exposed part 46 to be folded back, and holds the exposed part 46 between itself and the busbar main body 31. The conductor holding part 32 presses the exposed part 46 against the surface 31a of the busbar main body 31. Accordingly, the exposed part 46 is supported by the projection part 35 from one side in the thickness direction of the busbar main body 31, and supported by the conductor holding part 32 from the other side thereof. The conductor holding part 32 wound around the exposed part 46 regulates not only movement of the exposed part 46 toward a direction getting away from the surface 31a, but also movement of the exposed part 46 toward the extending direction of the flat cable 40. Accordingly, when an external force is applied to the cable part 45, the conductor holding part 32 holds the exposed part 46 against the external force, and regulates relative movement of the cable part 45 with respect to the busbar main body 31 and deformation of the cable part 45. Thus, the conductor holding part 32 according to the first embodiment suppresses a change in stress or generation of an excessive stress at a welded portion between the projection part 35 and the exposed part 46, and protects the welded portion.

As illustrated in FIG. 8, the conductor holding part 32 is wound around the exposed part 46 to be folded back, and holds the exposed part 46 with an inner surface of a curved part 32b. An inner diameter of the curved part 32b is sufficiently small to regulate relative movement of the exposed part 46 with respect to the busbar main body 31. A size L1 of a gap between the distal end of the conductor holding part 32 and the surface 31a of the busbar main body 31 is sufficiently smaller than an outer diameter of the exposed part 46. The conductor holding part 32 holds the exposed part 46 to regulate movement of the exposed part 46 in the axial direction of the exposed part 46 or a direction intersecting with the axis thereof. Thus, when external force caused by bending, pulling, and the like is applied to the cable part 45 from the main body side of the flat cable 40, the conductor holding part 32 regulates propagation of the external force toward the distal end side of the exposed part 46 across the conductor holding part 32. That is, the conductor holding part 32 regulates propagation of the external force to the welded part between the exposed part 46 and the projection part 35. The conductor holding part 32 also regulates deformation of the exposed part 46 when external force is applied to the cable part 45.

Accordingly, the conductive member module 20 according to the first embodiment can improve durability of a connection part between the conductor 41 of the flat cable 40 and the busbar 30, and improve stability of an electrically connected state. In the conductive member module 20 according to the first embodiment, the busbar 30 is electrically connected to the conductor 41 at two positions, that is, the projection part 35 and the conductor holding part 32. Accordingly, durability of the connection part between the conductor 41 and the busbar 30 is increased, and a conduction failure is prevented.

As described above, the conductive member module 20 according to the first embodiment includes the flat cable 40 and the busbars 30. The flat cable 40 includes the conductors 41 and the insulating coating 42 that covers the conductors 41, and the distal end part of the conductor 41 is exposed from the coating 42. The busbar 30 includes the busbar main body 31 and the conductor holding part 32. The busbar main body 31 is a plate-shaped constituent part that includes the insertion holes 34 into which the electrode terminals 13 are inserted, and is connected, by welding, to the exposed part 46 of the conductor 41 exposed from the coating 42. The conductor holding part 32 is integrally formed with the busbar main body 31, and folded back toward the busbar main body 31 to hold a portion of the conductor 41 closer to the base end side than the part welded to the busbar main body 31. The busbars 30 are continuously arranged along the extending direction of the flat cable 40.

The conductor holding part 32 holds a portion of the conductor 41 closer to the base end side than the part welded to the busbar main body 31. Accordingly, by suppressing stress variation in the welded part between the busbar main body 31 and the conductor 41, the conductive member module 20 according to the first embodiment can improve durability of the connection part between the busbar 30 and the conductor 41.

The conductor holding part 32 is wound around the conductor 41 to hold the conductor 41. The conductor holding part 32 may hold the conductor 41 while being in contact with the conductor 41, or may be wound around the coating 42 covering the conductor 41 to hold the conductor 41 via the coating 42. By regulating relative movement of the conductor 41 with respect to the busbar main body 31, the conductor holding part 32 wound around the conductor 41 can improve durability of the connection part between the busbar 30 and the conductor 41.

The battery pack 1 according to the first embodiment includes the battery module 10 including the battery cells 11, the flat cable 40, and the busbars 30. The flat cable 40 includes the conductors 41 and the insulating coating 42 that covers the conductors 41, and the distal end part of the conductor 41 is exposed from the coating 42. The busbars 30 each include the busbar main body 31 and the conductor holding part 32, are continuously arranged along the extending direction of the flat cable 40, and electrically connect the battery cells 11 in series or in parallel. The busbar main body 31 is a plate-shaped constituent part that includes the insertion holes 34 into which the electrode terminals 13 of the battery cell 11 are inserted, and is connected, by welding, to the exposed part 46 of the conductor 41 exposed from the coating. The conductor holding part 32 is integrally formed with the busbar main body 31, and folded back toward the busbar main body 31 to hold a portion of the conductor 41 closer to the base end side than the part welded to the busbar main body 31.

By suppressing stress variation in the welded part between the busbar main body 31 and the conductor 41, the battery pack 1 according to the first embodiment can improve durability of the connection part between the busbar 30 and the conductor 41.

The conductor holding part 32 may hold the conductor 41 covered by the coating 42 instead of holding the exposed part 46. In other words, the conductor holding part 32 may hold the conductor 41 via the coating 42.

Second Embodiment

Figure 9:
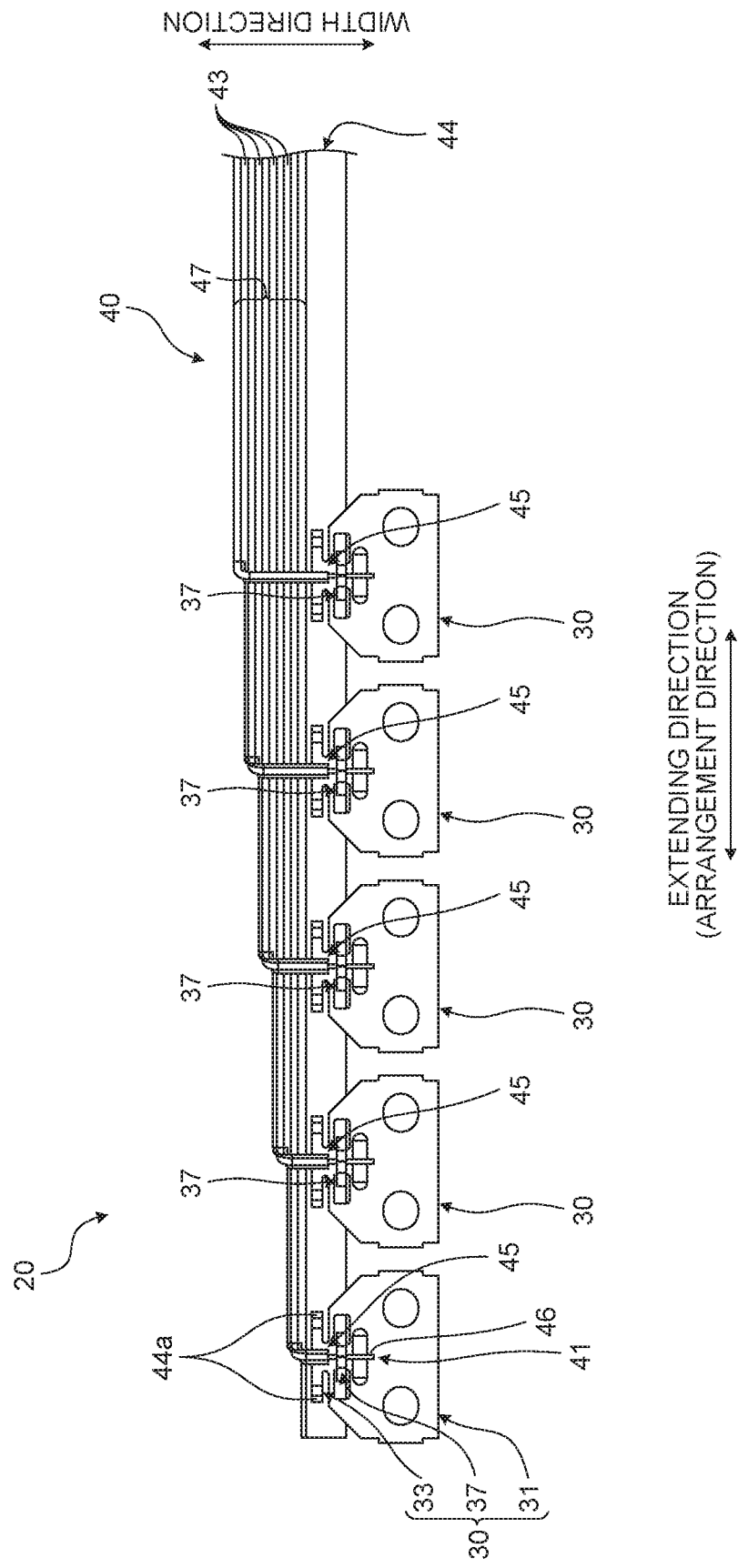
FIG. 9 is a plan view of a conductive member module according to a second embodiment.
Figure 10:
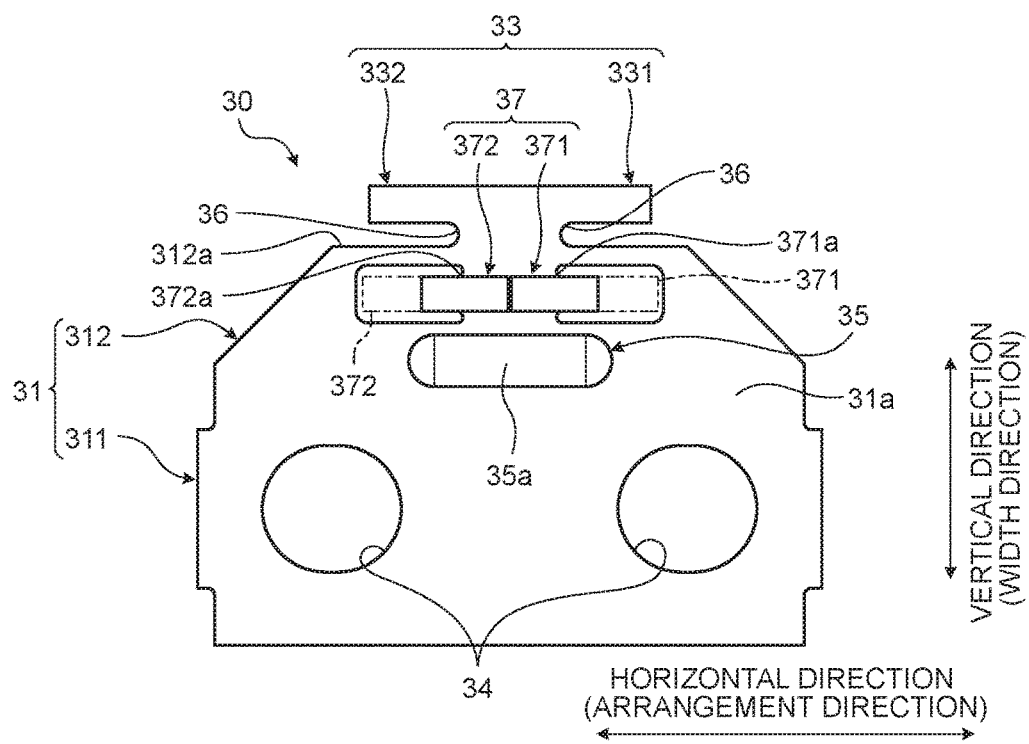
FIG. 10 is a plan view of a busbar according to the second embodiment.
Figure 11:
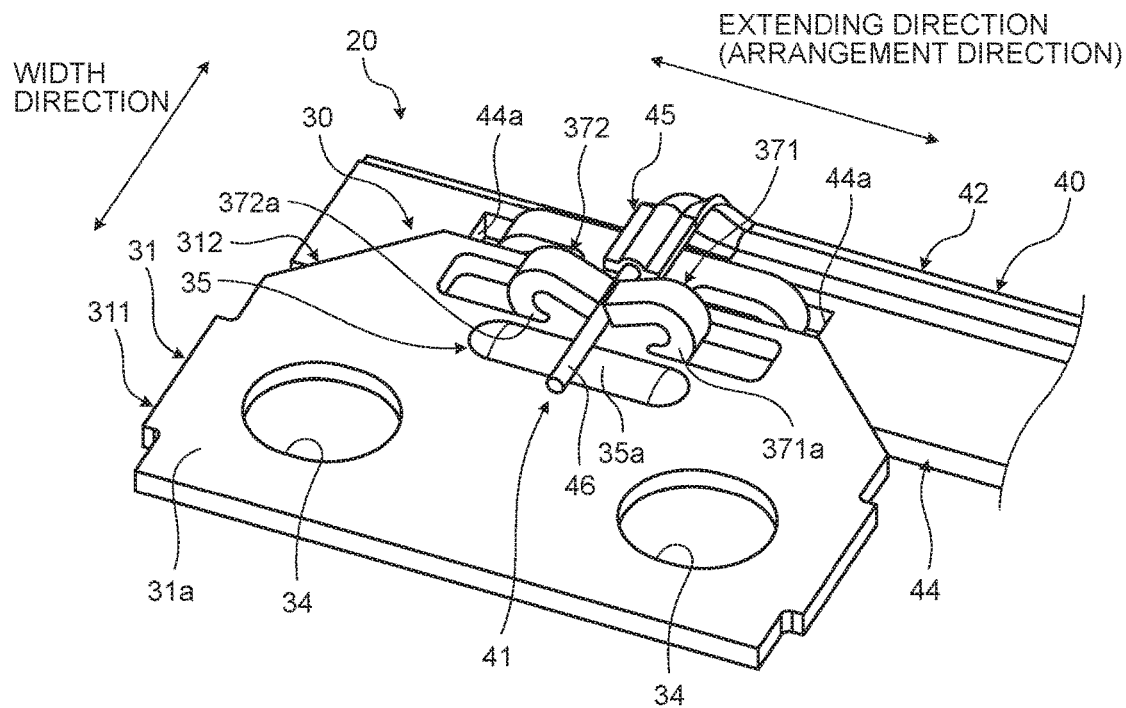
FIG. 11 is a perspective view illustrating a coupling state between the busbar and a flat cable according to the second embodiment.
Figure 12:
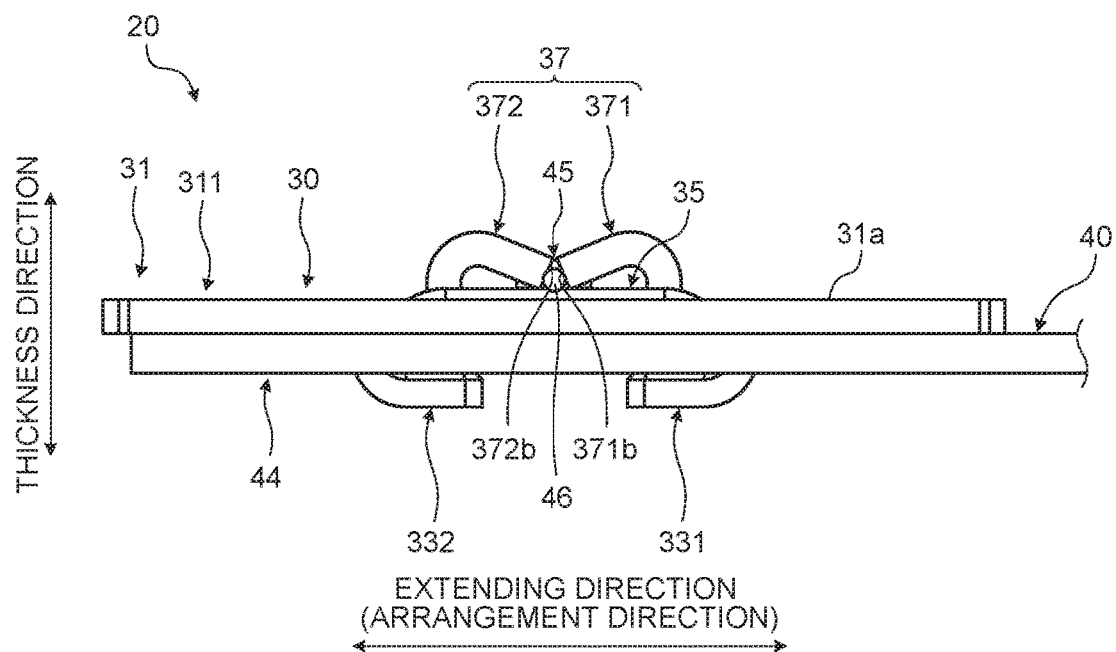
FIG. 12 is a front view illustrating the coupling state between the busbar and the flat cable according to the second embodiment.

The following describes a second embodiment with reference to FIGS. 9 to 12. In the second embodiment, components having the same function as that described in the first embodiment are denoted by the same reference numerals, and redundant description will not be repeated. FIG. 9 is a plan view of the conductive member module according to the second embodiment, FIG. 10 is a plan view of the busbar according to the second embodiment, FIG. 11 is a perspective view illustrating a coupling state between the busbar and the flat cable according to the second embodiment, and FIG. 12 is a front view illustrating the coupling state between the busbar and the flat cable according to the second embodiment.

The busbars 30 are formed, for example, by punching a metal plate. Each busbar 30 includes a conductor holding part 37 in place of the conductor holding part 32 in the first embodiment. In FIG. 10, a solid line indicates the conductor holding part 37 and the cable holding part 33 on which folding processing (crimping) is performed, and a chain double-dashed line indicates the conductor holding part 37 before folding processing is performed.

As illustrated in FIGS. 10 and 11, the conductor holding part 37 of the busbar 30 according to the second embodiment includes a first holding part 371 and a second holding part 372. The first holding part 371 and the second holding part 372 each have a rectangular plane shape. As illustrated in FIG. 11, the first holding part 371 is arranged on one side in the extending direction of the flat cable 40 with respect to the exposed part 46. The second holding part 372 is arranged on the other side in the extending direction of the flat cable 40 with respect to the exposed part 46. In other words, as illustrated in FIG. 10, the first holding part 371 is arranged in a region on one side in the horizontal direction with respect to a center part 35a of the projection part 35, and the second holding part 372 is arranged in a region on the other side in the horizontal direction with respect to the center part 35a. The conductor holding part 37 is formed, for example, by cutting processing. In each of the first holding part 371 and the second holding part 372, three sides of the rectangle including two long sides are cut and separated from the second constituent part 312, and the other one side closer to the center in the horizontal direction is connected to the second constituent part 312.

The first holding part 371 and the second holding part 372 are folded back toward the busbar main body 31, and hold a portion of the exposed part 46 on the base end side. The first holding part 371 is folded back toward the second holding part 372 at an end 371a on the second holding part 372 side serving as a base end part. The second holding part 372 is folded back toward the first holding part 371 at an end 372a on the first holding part 371 side serving as a base end part. As illustrated in FIG. 12, a distal end face 371b of the folded-back first holding part 371 faces the surface 31a of the busbar main body 31. The distal end face 371b presses the exposed part 46 against the surface 31a, and presses the exposed part 46 in the horizontal direction toward the second holding part 372. A distal end face 372b of the folded-back second holding part 372 faces the surface 31a. The distal end face 372b presses the exposed part 46 against the surface 31a, and presses the exposed part 46 in the horizontal direction toward the first holding part 371. That is, the distal end of the first holding part 371 and the distal end of the second holding part 372 press the exposed part 46 against the surface 31a while sandwiching the exposed part 46.

A portion on the distal end side of the exposed part 46 is connected to the projection part 35 by welding. That is, the exposed part 46 is supported by the projection part 35. Accordingly, the exposed part 46 that is pressed against the surface 31a by the first holding part 371 and the second holding part 372 is held among the distal end of the first holding part 371, the distal end of the second holding part 372, and the projection part 35. As illustrated in FIG. 12, the first holding part 371, the second holding part 372, and the projection part 35 support the exposed part 46 from different three directions when viewed from the axial direction along the axis of the exposed part 46. The first holding part 371 and the second holding part 372 regulate movement of the cable part 45 in the extending direction of the flat cable 40, and regulate movement of the cable part 45 in a direction getting away from the surface 31a in the thickness direction. Thus, the conductive member module 20 according to the second embodiment can regulate movement or deformation of the exposed part 46 against an external force applied to the cable part 45, and improve durability of the connection part between the conductor 41 of the flat cable 40 and the busbar 30.

The first holding part 371 and the second holding part 372 may press the exposed part 46 against the surface 31a of the busbar main body 31 so that the exposed part 46 is sandwiched among the first holding part 371, the second holding part 372, and the surface 31a. With such a configuration, the exposed part 46 can be held further firmly by the conductor holding part 37. Additionally, the external force input from the main body side of the flat cable 40 is more securely prevented from propagating to the welded portion between the exposed part 46 and the projection part 35.

As described above, in the conductive member module 20 according to the second embodiment, the conductor holding part 37 includes the first holding part 371 and the second holding part 372. The distal end of the first holding part 371 and the distal end of the second holding part 372 sandwich the conductor 41, and hold the conductor 41 among the first holding part 371, the second holding part 372, and the busbar main body 31. Thus, the conductive member module 20 according to the second embodiment and the battery pack 1 including the conductive member module 20 can regulate relative movement of the conductor 41 with respect to the busbar main body 31, and improve durability of the connection part between the busbar 30 and the conductor 41.

Modifications of Embodiments

The following describes modifications of the first embodiment and the second embodiment. A method of connecting the busbar 30 to the battery cell 11 may be welding. In this case, the busbar 30 does not necessarily have the insertion holes 34. A type of welding is not specifically limited. For example, ultrasonic welding, laser welding, and the like may be used.

The conductive member is not limited to the busbar 30 that connects the battery cells 11 to each other. The conductive member 11 may be, for example, a voltage detection terminal. The voltage detection terminal configures, together with the flat cable 40 and the like, a voltage detection circuit that detects voltage of the battery cell 11 and the battery module 10. For example, the voltage detection terminal is electrically connected, by welding and the like, to the busbar that connects the battery cells 11 or the electrode terminal 13. When the voltage detection terminal is used as the conductive member, the conductive member module 20 functions as a voltage detection module.

A conductive member module and a battery pack according to each of the present embodiments include, a flat cable including a plurality of conductors and an insulating coating covering the conductors, a distal end part of each of the conductors being exposed from the coating, and a plurality of conductive members. The conductive members each include a plate-shaped main body and a conductor holding part, and are continuously arranged along an extending direction of the flat cable, the main body being connected, by welding, to a portion of the conductor exposed from the coating, and the conductor holding part being separated from the main body at other sides except for one side connected to the main body by cutting in the main body and being folded back toward the main body to hold a portion of the conductor closer to a based end side than a part welded to the main body.

The conductive member module and the battery pack according to each of the present embodiments include a conductor holding part in which a main body of the conductive member holds the conductor not only at the welded part but also at a portion closer to the base end side than the welded part. The conductor holding part may hold the conductor while being in contact with the conductor, or may hold the conductor from the outside of the coating. The conductive member module and the battery pack according to the present embodiment can improve durability of the connection part between the conductive member and the conductor of the flat cable.

Contents disclosed in each of the embodiments and modifications described above can be appropriately combined to be implemented.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive member module comprising:
   a flat cable that includes a plurality of conductors and an insulating coating covering the conductors, a distal end part of each of the conductors being exposed from the coating; and
   a plurality of conductive members each of which includes a plate-shaped main body and a conductor holding part, the main body being connected to a portion of each of the conductors exposed from the coating by welding, the conductor holding part being separated from the main body at other sides except for one side connected to the main body by cutting in the main body and being folded back toward the main body to hold a portion of the conductor closer to a base end side than a part welded to the main body, the conductive members being continuously arranged along an extending direction of the flat cable.

2. The conductive member module according to claim 1, wherein
the conductor holding part is wound around the conductor to hold the conductor.

3. The conductive member module according to claim 1, wherein
the conductor holding part includes a first holding part and a second holding part, and
a distal end of the first holding part and a distal end of the second holding part sandwich the conductor, and hold the conductor among the first holding part, the second holding part, and the main body.

4. A battery pack comprising:

a battery module that includes a plurality of battery cells;

a flat cable that includes a plurality of conductors and an insulating coating covering the conductors, a distal end part of each of the conductors being exposed from the coating; and a plurality of conductive members each of which includes a plate-shaped main body and a conductor holding part, the main body being connected to a portion of each of the conductors exposed from the coating by welding, the conductor holding part being separated from the main body at other sides except for one side connected to the main body by cutting in the main body and being folded back toward the main body to hold a portion of the conductor closer to a base end side than a part welded to the main body, the conductive members being continuously arranged along an extending direction of the flat cable.

* * * * *